US 8,111,781 B2

(12) United States Patent
Chang (10) Patent No.: US 8,111,781 B2
(45) Date of Patent: Feb. 7, 2012

(54) RADIO FREQUENCY IDENTIFICATION (RFID) INTERROGATORS

(75) Inventor: Hsu-Hung Chang, Tai-Chung (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 690 days.

(21) Appl. No.: 11/853,024

(22) Filed: Sep. 11, 2007

(65) Prior Publication Data

US 2008/0136593 A1    Jun. 12, 2008

(30) Foreign Application Priority Data

Dec. 6, 2006   (TW) ................................ 95145475 A (51) Int. Cl.
*H04L 27/00* (2006.01)
(52) U.S. Cl. ........ 375/316; 375/147; 375/150; 375/340; 375/343; 375/354
(58) Field of Classification Search .................. 375/316, 375/147, 150, 340, 343, 354; 340/10.1, 10.4, 340/572.1, 572.4
See application file for complete search history.

(56) References Cited

U.S. PATENT DOCUMENTS

| 2006/0145813 | A1 | 7/2006 | Haller |
| 2006/0229041 | A1* | 10/2006 | Ninomiya et al. .......... 455/196.1 |
| 2007/0188305 | A1* | 8/2007 | Drucker ...................... 340/10.4 |
| 2008/0048870 | A1* | 2/2008 | Laitta et al. ................ 340/573.6 |

FOREIGN PATENT DOCUMENTS

TW      200601719       1/2006

\* cited by examiner

*Primary Examiner* — Dhaval Patel
(74) *Attorney, Agent, or Firm* — Winston Hsu; Scott Margo (57) ABSTRACT

An RFID interrogator includes a signal processing module for converting a transmission signal transmitted from an RFID tag into an input signal; a first matched filter coupled to the signal processing module for generating a first matched signal according to the input signal and a first predetermined signal pattern; a second matched filter coupled to the signal processing module for generating a second matched signal according to the input signal and a second predetermined signal pattern; a control unit for generating a control signal according to the input signal; and a decision unit, coupled to the first matched filter, the second matched filter and the control unit, for comparing the first matched signal with the second matched signal according to the control signal to generate a read-back signal.

27 Claims, 10 Drawing Sheets

RADIO FREQUENCY IDENTIFICATION (RFID) INTERROGATORS

BACKGROUND OF THE INVENTION

1. Field of the Invention

The present invention relates to a radio frequency identification (RFID) technology, and more particularly, to schemes of RFID interrogators.

2. Description of the Prior Art

Radio frequency identification (RFID) technology has already been widely applied in many fields such as aviation baggage monitoring, warehouse management, logistics management, burglarproof security service systems, automatic charge systems, quality management, and medical management, etc. due to improvements in technology and decreasing costs. In an RFID system, an RFID interrogator/reader and an RFID tag utilize wireless radio frequency (RF) signals to perform non-contact half-duplex data transmission between each other in order to achieve the purpose of object identification or data exchange.

Electronic tags can be divided into two schemes of active electronic tags and passive electronic tags. The active electronic tag includes an internal power source, and thus is able to actively send data to the RFID interrogator. In addition, the active electronic tag has a longer effective response distance, but has a shorter lifetime, a bigger volume, and a higher cost. The passive electronic tag does not have an internal power source, and it receives the RF signals sent from the RFID interrogator and converts the RF signals into the electrical energy required by the internal circuit operation. In comparison with the active electronic tag, the passive electronic tag has a smaller volume, a lower cost, and a longer lifetime.

When the electronic tag receives a query command sent from the RFID interrogator, the electronic tag will send a unique identification data back to the RFID interrogator for identification. The conventional passive electronic tag does not have an internal crystal oscillator, and the conventional passive electronic tag usually utilizes an LC oscillator to provide the required reference clock. However, the frequency resonated by the LC oscillator often drifts, and results in great variation in the symbol times of the signals sent back from the passive electronic tag. This condition will increase the possibility of errors occurring when the conventional RFID interrogator demodulates the received identification data, resulting in the integral efficiency of the RFID interrogator being reduced.

SUMMARY OF THE INVENTION

It is therefore one of the objectives of the present invention to provide a radio frequency identification (RFID) interrogator capable of demodulating signals transmitted back from an active electronic tag so as to solve the above problem.

According to an embodiment of the present invention, an RFID interrogator is disclosed. The RFID interrogator comprises: a signal processing module, for generating an input signal according to a transmission signal transmitted from an RFID tag; a first matched filter, coupled to the signal processing module, for generating a first matched signal according to the input signal and a first predetermined signal pattern; a second matched filter, coupled to the signal processing module, for generating a second matched signal according to the input signal and a second predetermined signal pattern; a control unit, for generating a control signal according to the input signal; and a decision unit, coupled to the first matched filter, the second matched filter and the control unit, for comparing the first matched signal with the second matched signal according to the control signal to generate a read-back signal.

According to an embodiment of the present invention, an RFID interrogator is further disclosed. The RFID interrogator comprises: a signal processing module, for generating a detection signal and an input signal according to a transmission signal transmitted from an RFID tag, wherein the detection signal corresponds to transitions of the input signal; a first matched filter, coupled to the signal processing module, for generating a first matched signal according to the input signal and a first predetermined signal pattern; a second matched filter, coupled to the signal processing module, for generating a second matched signal according to the input signal and a second predetermined signal pattern; a control unit, for receiving the detection signal so as to generate a control signal; and a decision unit, coupled to the first matched filter, the second matched filter and the control unit, for comparing the first matched signal with the second matched signal according to the control signal to generate a read-back signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
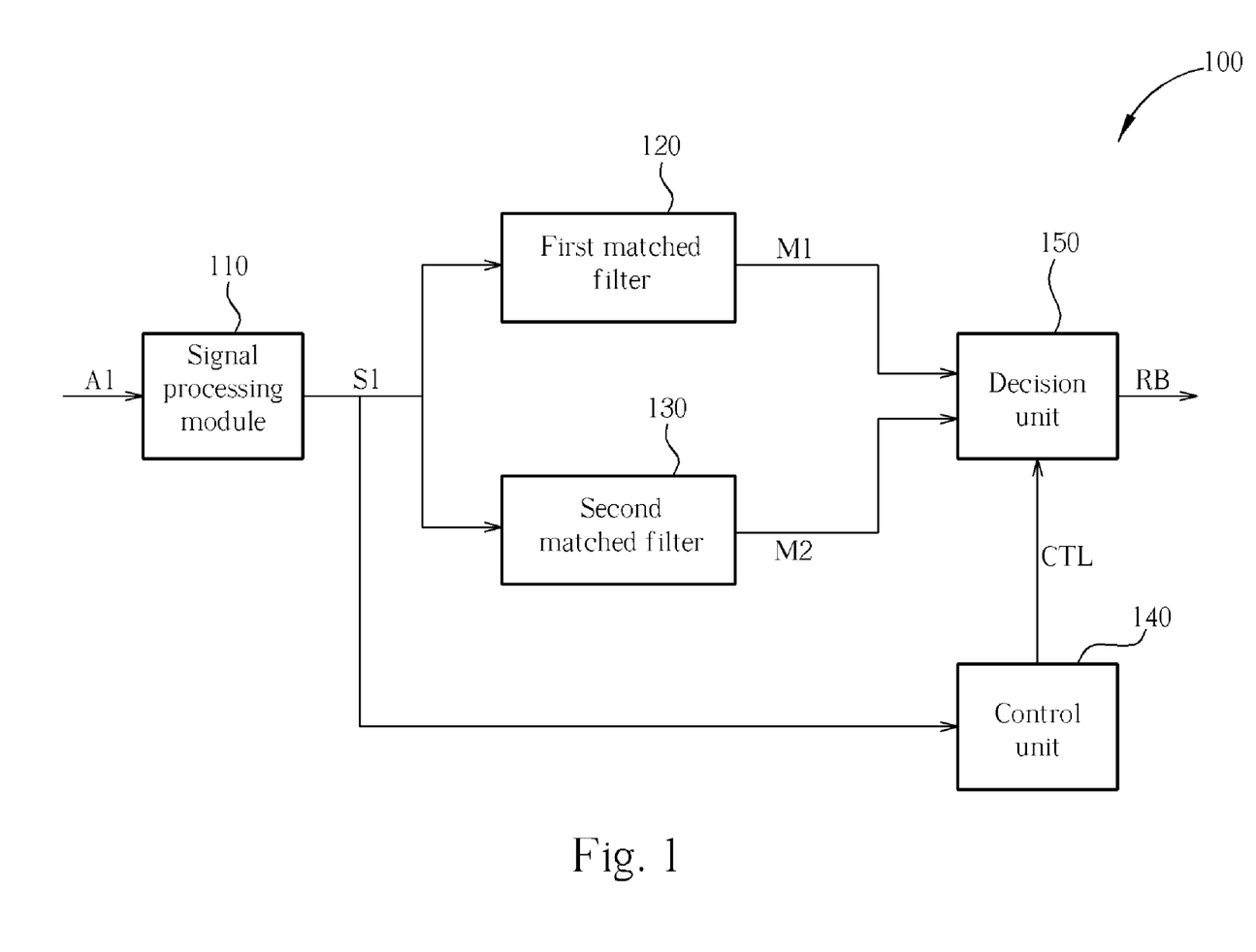
FIG. 1 is a simplified block diagram of a radio frequency identification (RFID) interrogator/reader according to an embodiment of the present invention.

Please refer to FIG. 1. FIG. 1 shows a simplified block diagram of a radio frequency identification (RFID) interrogator/reader 100 according to an embodiment of the present invention. As shown in FIG. 1, the RFID interrogator 100 includes a signal processing module 110, a first matched filter 120, a second matched filter 130, a control unit 140, and a decision unit 150. In operation, a radio frequency (RF) antenna (not shown) of the RFID interrogator 100 will utilize an RF signal to send a query command. After an RFID tag positioned inside a valid transmission range of the RF signal receives the query command, the RFID tag will transmit the data back to the RFID interrogator 100 by a backscattering method.

When a receiving module (not shown) of the RFID interrogator 100 receives an analog transmission signal A1 transmitted from the RFID tag, the RFID interrogator 100 will utilize the signal processing module 110 to generate an input signal S1 according to the transmission signal A1. In practice, the transmission signal A1 transmitted by the RFID tag can have different data encoding formats. For example, the data encoding formats that are usually used for the RFID tag are an FM0 encoding format and a Miller encoding format. The RFID tag will select a corresponding data encoding format to demodulate the data for transmission to the RFID interrogator 100 according to the command sent by the RFID interrogator 100. If the transmission signal A1 is an FM0 encoding signal, then the signal processing module 110 will convert the transmission signal A1 from an analog format into a digital format so as to generate the input signal S1. If the transmission signal A1 is a Miller encoding signal, then the signal processing module 110 will convert the Miller encoding signal back to a Miller basis signal so as to generate the input signal S1. The operation and practical scheme of the signal processing module 110 will be further described in the following paragraphs with reference to FIG. 2.

Figure 2:
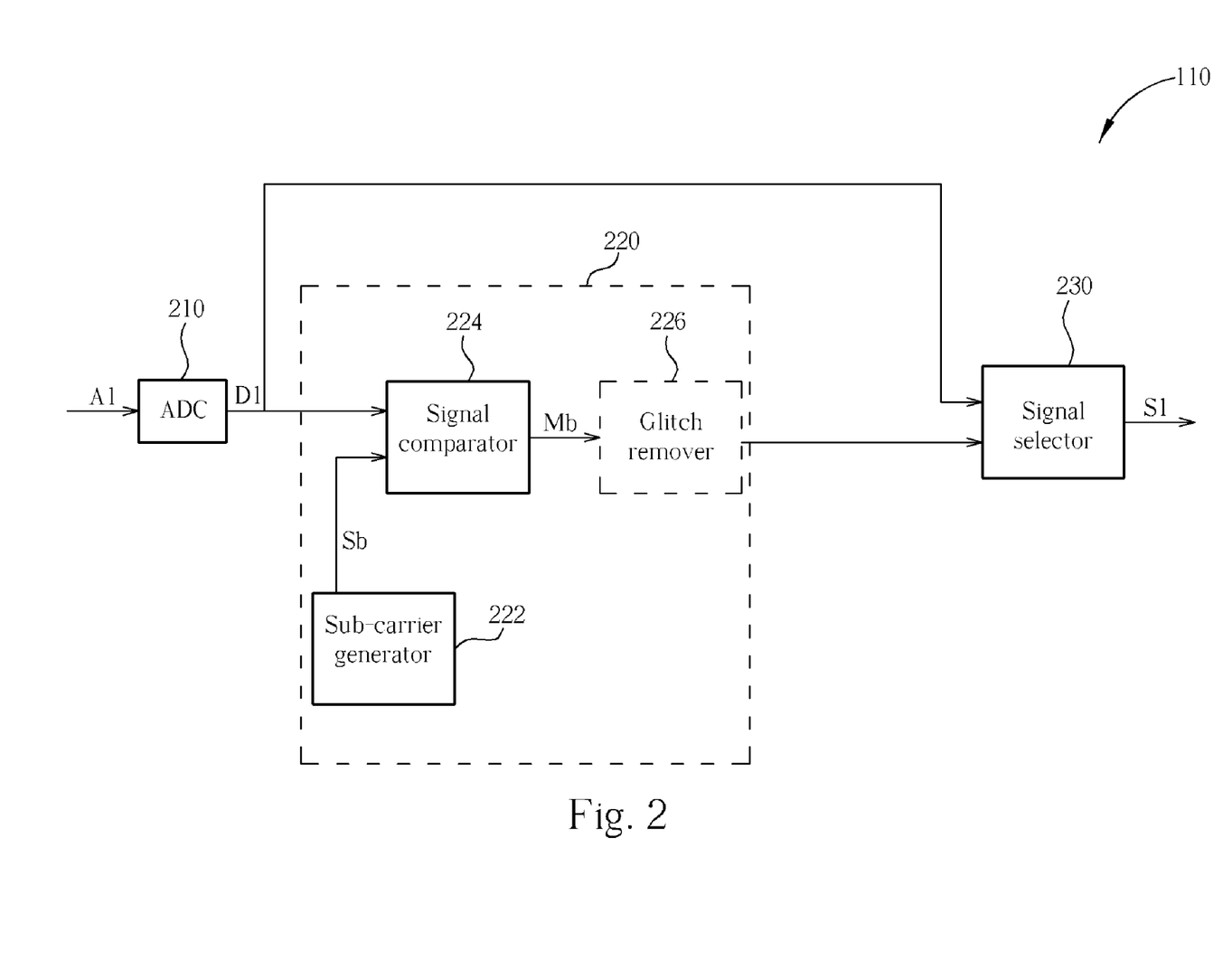
FIG. 2 is a simplified block diagram of the signal processing module according to an embodiment of the present invention.

FIG. 2 shows a simplified block diagram of the signal processing module 110 according to an embodiment of the present invention. In this embodiment, the signal processing module 110 includes an analog-to-digital converter (ADC) 210, a Miller demodulator 220, and a signal selector 230. The ADC 210 is utilized for converting the transmission signal A1 in analog format into a digital signal D1. In a case of the transmission signal A1 being the FM0 encoding signal, the signal selector 230 will output the digital signal D1 (i.e. the FM0 encoding signal after being digitized) as the input signal S1. If the transmission signal A1 is a Miller encoding signal, then the signal processing module 110 will utilize the Miller demodulator 220 to demodulate the digital signal D1 (i.e. the Miller encoding signal after being digitized) outputted by the ADC 210 to the Miller basis signal, and the signal selector 230 will output the Miller basis signal as the input signal S1. In practice, the signal processing module 110 can also enable the Miller demodulator 220 only in a case of the transmission signal A1 being the Miller encoding signal, in order to save the required power consumption.

As shown in FIG. 2, the Miller demodulator 220 of this embodiment includes a sub-carrier generator 222 and a signal comparator 224. When the transmission signal A1 is the Miller encoding signal, the sub-carrier generator 222 will generate a sub-carrier signal Sb corresponding to the transmission signal A1. The signal comparator 224 is utilized for comparing the digital signal D1 (i.e. the Miller encoding signal after being digitized) with the sub-carrier signal Sb so as to generate a Miller basis signal Mb.

Figure 3:
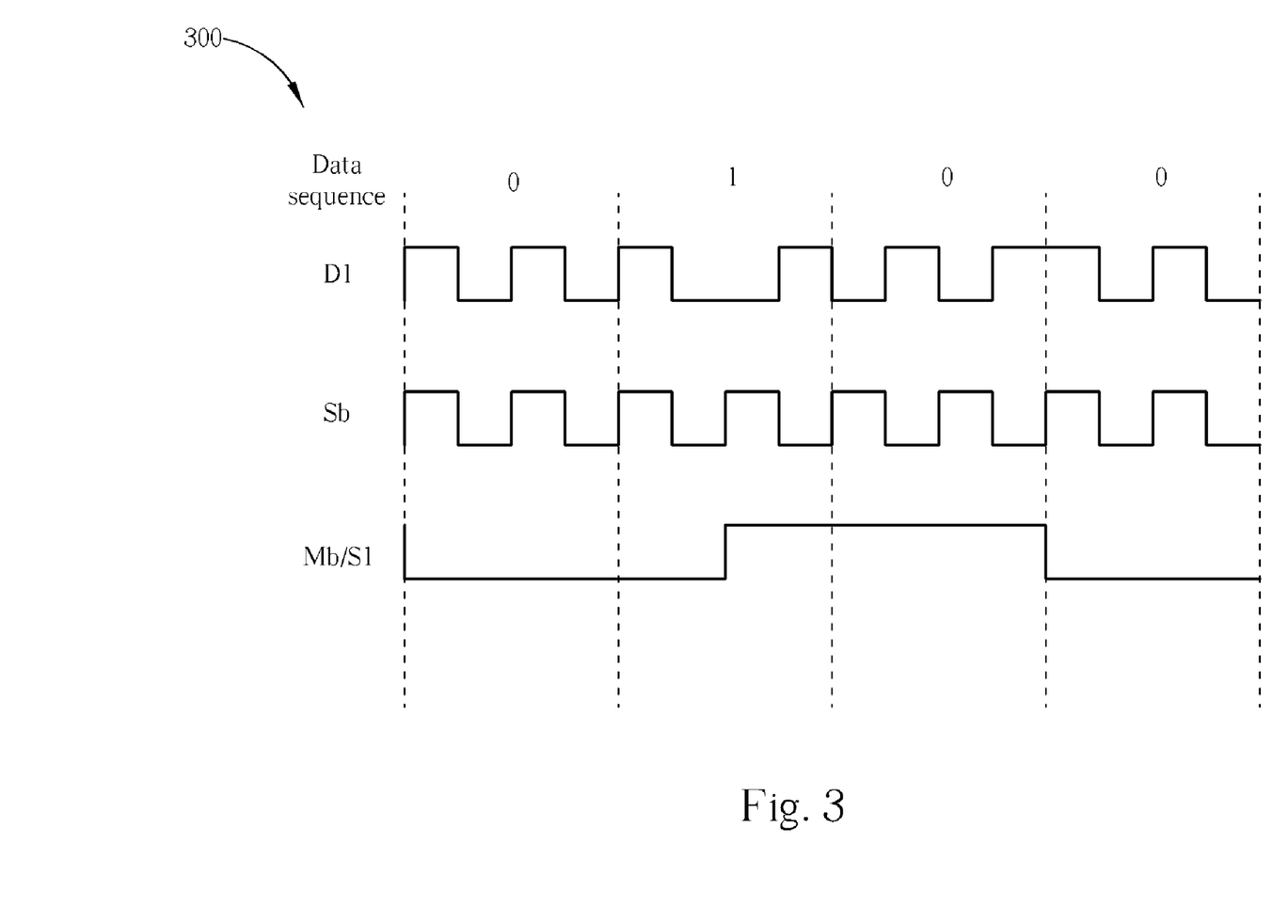
FIG. 3 is a timing diagram for the Miller demodulator shown in FIG. 2 according to an operation embodiment of the present invention.

Please refer to FIG. 3. FIG. 3 depicts a timing diagram 300 for the Miller demodulator 220 according to an operation embodiment of the present invention. For brevity of description, the digital signal D1 is assumed to correspond to the Miller encoding signal in the data sequence 0100 where the value of M is equal to 2 in FIG. 3. Since the value of M is indicated by the RFID interrogator 100 in practice, the value of M is a known value for the sub-carrier generator 222. In addition, the sub-carrier generator 222 is able to estimate the symbol length in the digital signal D1 according to a preamble in the digital signal D1, and to generate the sub-carrier signal Sb shown in the timing diagram 300 according to the estimated symbol length and the value of M. In a preferred embodiment, the sub-carrier generator 222 will align the phase of the sub-carrier signal Sb with that of the digital signal D1. In this embodiment, the signal comparator 224 is an XOR logic, utilized for performing an XOR operation for the digital signal D1 and the sub-carrier signal Sb, so as to generate the Miller basis signal Mb shown in FIG. 3. In this embodiment, since the digital signal D1 is the Miller encoding signal, the signal selector 230 will output the Miller basis signal Mb as the input signal S1.

Please note that the signal comparator 224 in the Miller demodulator 220 can also be realized by an NXOR logic in practice. In a preferred embodiment, a glitch remover 226 will be further implemented at the back stage of the signal comparator 224 in the Miller demodulator 220, and the glitch remover 226 is utilized for reducing the glitch in the Miller basis signal Mb.

Next, the first matched filter 120 will generate a first matched signal M1 according to the input signal S1 and a first predetermined signal pattern, and the second matched filter 130 will generate a second matched signal M2 according to the input signal S1 and a second predetermined signal pattern. In a case of the transmission signal A1 being the FM0 encoding signal (i.e. the input signal S1 is the FM0 encoding signal after being digitized), the first predetermined signal pattern utilized by the first matched filter 120 corresponds to the data 0 symbol of the FM0 encoding format, and the second predetermined signal pattern utilized by the second matched filter 130 corresponds to the data 1 symbol of the FM0 encoding format. On the other hand, in a case of the transmission signal A1 being the Miller encoding signal (i.e. the input signal S1 is the Miller basis signal), the first predetermined signal pattern utilized by the first matched filter 120 corresponds to the data 0 symbol of the Miller basis signal, and the second predetermined signal pattern utilized by the second matched filter 130 corresponds to the data 1 symbol of the Miller basis signal. In this embodiment, when the input signal S1 conforms with the first predetermined signal pattern, the signal value of the first matched signal M1 outputted by the first matched filter 120 will be larger than when the input signal S1 does not conform with the first predetermined signal pattern. Similarly, when the input signal S1 conforms with the second predetermined signal pattern, the signal value of the second matched signal M2 outputted by the second matched filter 130 will be larger than when the input signal S1 does not conform with the second predetermined signal pattern.

In practice, it is also feasible to implement two groups of matched filters in the RFID interrogator 100, where each group includes two matched filters respectively, wherein one group of the matched filters is utilized to process the case of the input signal S1 being the FM0 encoding signal after being digitized, and another group of the matched filters is utilized to process the case of the input signal S1 being the Miller basis signal. In this embodiment, the RFID interrogator 100 is able to select a corresponding group of the matched filters for utilization according to the format of the transmission signal A1 or the content of query command transmitted to the RFID tag.

Figure 4:
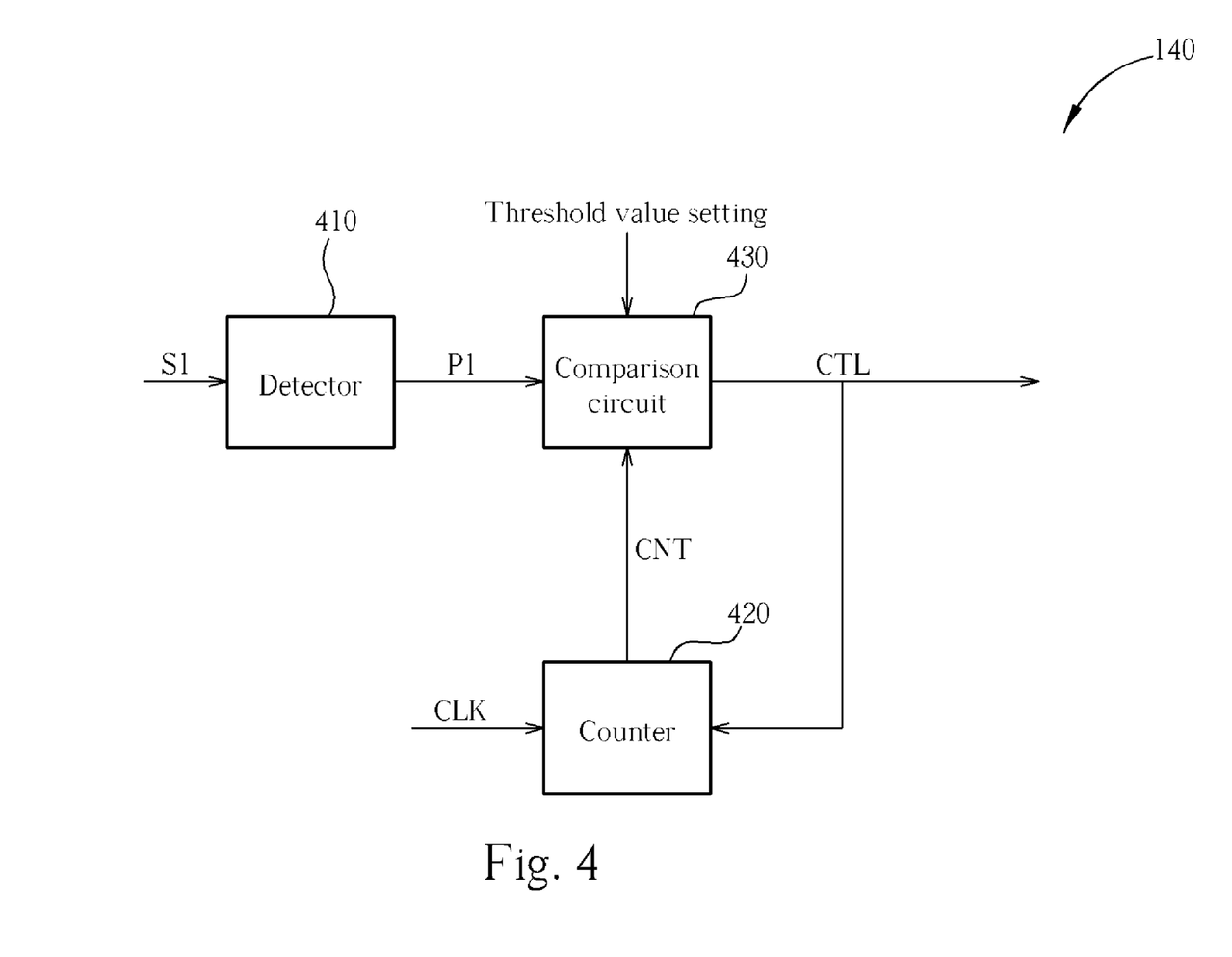
FIG. 4 is a simplified block diagram of the control unit shown in FIG. 1 according to an embodiment of the present invention.

The control unit 140 in the RFID interrogator 100 is designed to generate a control signal CTL according to the input signal S1, in order to control the time point of the decision unit 150 comparing the first matched signal M1 with the second matched signal M2. Please refer to FIG. 4. FIG. 4 shows a simplified block diagram of the control unit 140 according to an embodiment of the present invention. In this embodiment, the control unit 140 includes a detector 410, a counter 420, and a comparison circuit 430. The detector 410 is utilized to detect transitions of the input signal S1. The counter 420 is utilized to perform a counter operation according to a clock signal CLK that has a higher frequency than that of the input signal S1, so as to output a counter value CNT to the comparison circuit 430. The comparison circuit 430 is utilized to compare the counter value CNT with at least a threshold value so as to determine the control signal CTL. It is possible for the input signal S1 to be the FM0 encoding signal or the Miller basis signal as stated in the above description. The operation scheme of the control unit 140 will vary according to the different formats of the input signal S1. Next, the operation scheme of the control unit 140 will be further described with reference to FIG. 5 and FIG. 6 in the following paragraphs.

Figure 5:
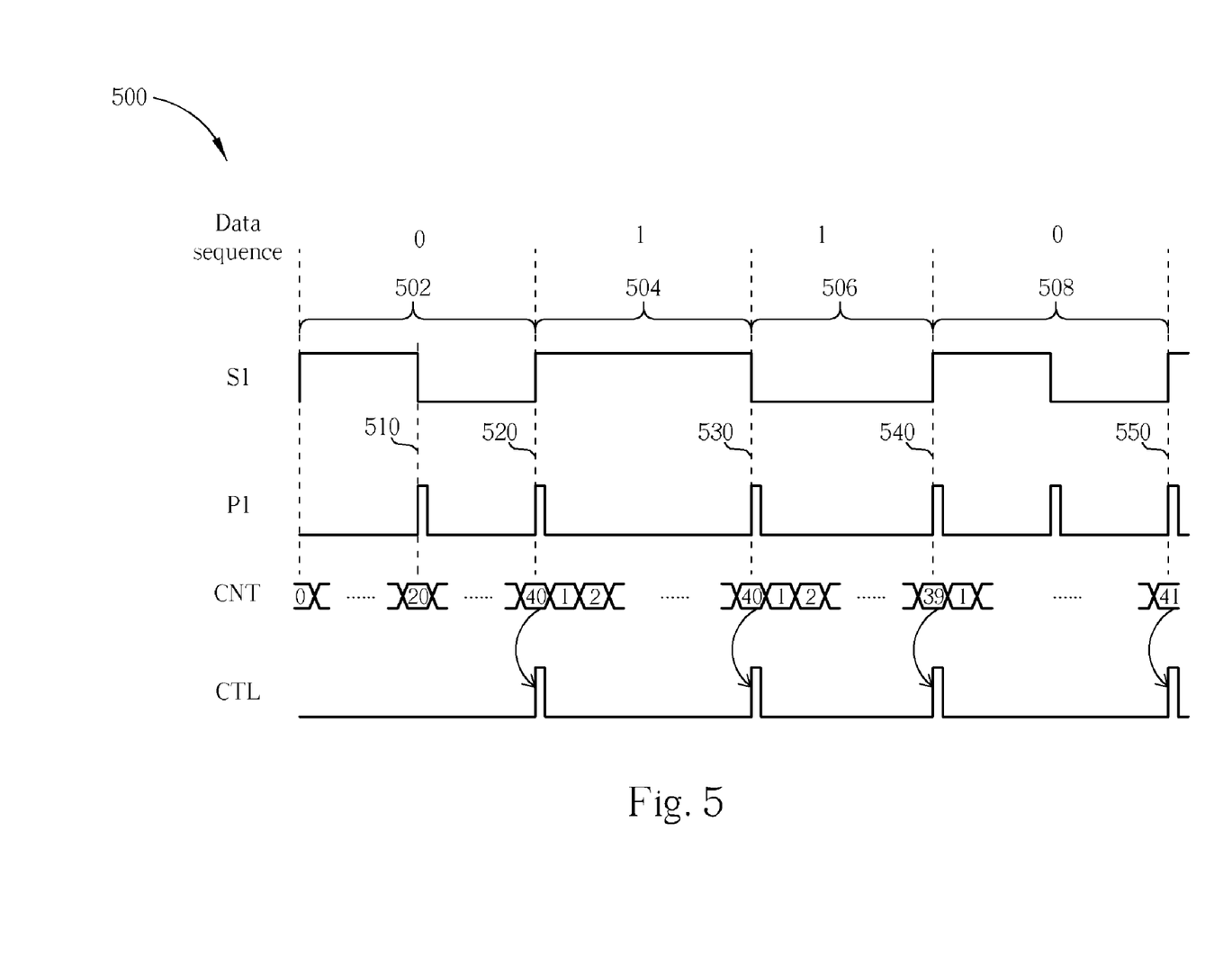
FIG. 5 is a timing diagram for the control unit shown in FIG. 4 according to an operation embodiment of the present invention.

Please refer to FIG. 5. FIG. 5 shows a timing diagram 500 for the control unit 140 shown in FIG. 4, when the input signal S1 becomes the FM0 encoding signal, according to an operation embodiment of the present invention. For brevity, the timing diagram 500 only depicts four FM0 encoding signal symbols 502, 504, 506, and 508, corresponding to the data 0, 1, 1, and 0 in the input signal S1. In this embodiment the detector 410 of the control unit 140 will trigger a pulse wave at every transition of the input signal S1 in order to form the detection signal P1 shown in FIG. 5. For brevity of description, the frequency of the clock signal CLK is assumed here to be 40 times as great as the frequency of the input signal S1. Under an ideal condition, if the counter 420 starts to perform the counter operation at the time point corresponding to the beginning of every symbol of the input signal S1, then the counter value CNT outputted by the counter 420 should be 40 at the end of the symbol (i.e. the common boundary of the symbol and the next symbol).

However, since a variation exists in the symbol time of the transmission signal A1 originally transmitted from the RFID tag, the symbol time of the input signal S1 generated by the transmission signal A1 will be inconsistent, resulting in the counter value CNT outputted by the counter 420 at the end of the symbol often being shifted from the ideal value 40. In addition, the input signal S1 in the FM0 encoding format will have transitions in the middle of the symbols corresponding to the data 0 in addition to having transitions at the end of every symbol.

Therefore, the comparison circuit 430 is able to perform a comparing operation for the counter value CNT of the counter 420 at the time point and a first predetermined threshold value TH1 (such as 30) each time the comparison circuit 430 receives a pulse wave of the detection signal P1 (i.e. the detector 410 detects that the input signal S1 has a transition), so as to determine whether the transition of the input signal S1 is in the common boundary of two adjacent symbols or in the middle of the data 0 symbols. In this embodiment, the first predetermined threshold value TH1 is set to be a counter value corresponding to 3 quarters of the symbol length of an ideal FM0 encoding signal symbol, which is 30. If the counter value CNT is smaller than the first predetermined threshold value TH1 (30), then the comparison circuit 430 will determine that the transition of the input signal S1 is in the middle of the data 0 symbols; otherwise, the comparison circuit 430 will determine that the transition of the input signal S1 is in the common boundary of two adjacent symbols.

As shown in the timing diagram 500, the counter 420 starts to perform the counter operation at the beginning time point of the FM0 encoding signal symbol 502. At the time point 510, the detector 410 detects that the input signal S1 has a transition, and thus the detector 410 will generate a pulse wave in the detection signal P1 to trigger the comparison circuit 430. Since the counter value CNT (20) at the time point is smaller than the first predetermined threshold value TH1 (30), the comparison circuit 430 will determine that the transition of the input signal S1 is in the middle of a data 0 symbol and thus the comparison circuit 430 will maintain the control signal CTL at a disabled level (which is logic 0 level in this embodiment). Next, the counter 420 will continue to perform the counter operation to make the counter value CNT increase progressively.

At the time point 520, the detector 410 again detects that the input signal S1 has a transition, and thus the detector 410 will generate a pulse wave in the detection signal P1 to trigger the comparison circuit 430. Since the counter value CNT (40) at the time point is larger than the first predetermined threshold value TH1 (30), the comparison circuit 430 will determine that the transition of the input signal S1 is in the common boundary of two adjacent symbols. Therefore, the comparison circuit 430 will generate an enabling pulse wave in the control signal CTL, so as to reset the counter operation of the counter 420 and command the decision unit 150 to perform a comparing operation for the first matched signal M1 and the second matched signal M2. For the same reason, at the time point 530, 540, and 550, since the counter value CNT at the time point is larger than the first predetermined threshold value TH1 (30), the comparison circuit 430 will determine that the time points correspond to the common boundary of the FM0 encoding signal symbols, and the comparison circuit 430 will generate the corresponding enabling pulse waves in the control signal CTL, so as to trigger the decision unit 150 and reset the counter operation of the counter 420.

The scheme of resetting the counter value CNT in the common boundary of the FM0 encoding signal symbols is able to prevent the comparison circuit 430 from having errors in the follow-up determinations due to the length inaccuracy of the prior symbols accumulated on the counter value CNT. In other words, even if there is inaccuracy in the symbol time of the input signal S1, the control unit 140 is still able to correctly find the ending position of every symbol in the input signal S1 of the FM0 encoding format.

Please note that the scheme of setting the first predetermined threshold value TH1 is only one implementation, and not a limitation, of the practical realization of the present invention.

As stated in the above description, the decision unit 150 compares the signal value of the first matched signal M1 with the signal value of the second matched signal M2 so as to generate a read-back signal RB when the enabling pulse waves of the control signal CTL are generated. For a further description, when the decision unit 150 of the embodiment is triggered by the enabling pulse waves of the control signal CTL, if the signal value of the first matched signal M1 is larger than the signal value of the second matched signal M2, then the decision unit 150 will set the read-back signal RB to be logic 0, and if the signal value of the first matched signal M1 is smaller than the signal value of the second matched signal M2, then the decision unit 150 will set the read-back signal RB to be logic 1.

Figure 6:
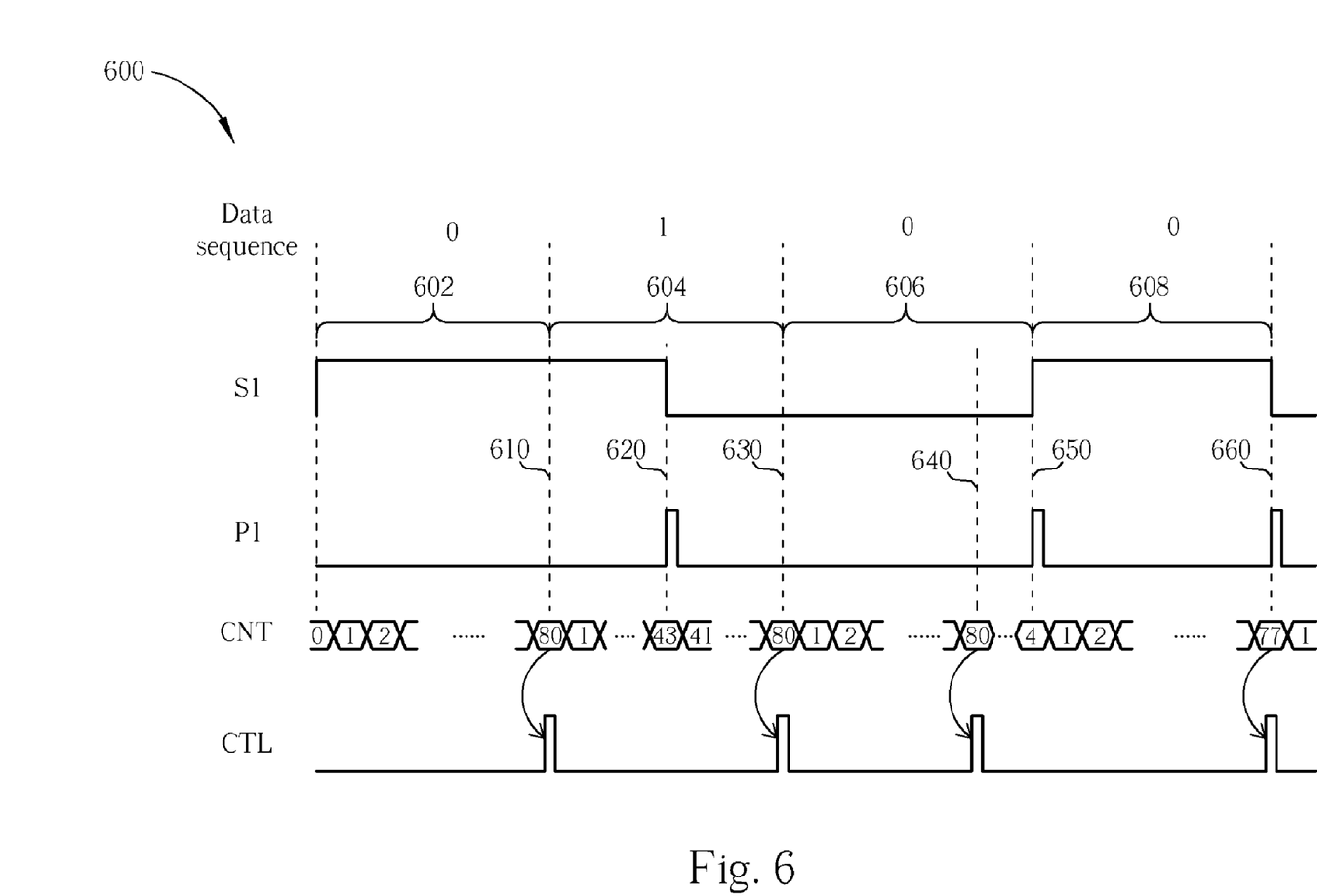
FIG. 6 is a timing diagram for the control unit shown in FIG. 4 when the input signal S1 is the Miller basis signal according to an operation embodiment of the present invention.

Please refer to FIG. 6. FIG. 6 shows a timing diagram 600 for the control unit 140 shown in FIG. 4 when the input signal S1 is the Miller basis signal according to an operation embodiment of the present invention. For brevity, the timing diagram 600 only depicts four Miller basis signal symbols 602, 604, 606, and 608 corresponding to the data 0, 1, 0, and 0 in the input signal S1. As in the above embodiment, the detector 410 of the control unit 140 will trigger a pulse wave at every transition of the input signal S1, in order to form a detection signal P1 shown in FIG. 6. For brevity of description, the period of the carrier signal utilized by the RFID tag for performing the Miller encoding is assumed here to be 4 microseconds, and the M value of the Miller encoding is 2. Under this condition, the ideal symbol time of the Miller basis signal in the input signal S1 is 8 microseconds. If the counter 420 performs the counter operation according to the clock signal CLK having a frequency of 10M Hz, then the length of every symbol in the input signal S1 should correspond to the counter value 80. In other words, if the counter 420 starts to perform the counter operation at the time point corresponding to the beginning of every symbol of the input signal S1, then the counter value CNT outputted by the counter 420 should be 80 at the end of the symbol (i.e. the common boundary of the symbol and the next symbol).

Since there is variation in the symbol time of the transmission signal A1 originally transmitted from the RFID tag, the symbol length of the Miller basis signal symbol in the input signal S1 generated according to the transmission signal A1 will be inconsistent. In addition, according to the characteristics of the Miller basis signal, transitions may not necessarily occur in the common boundary of two adjacent Miller basis signal symbols. Specifically, in the Miller basis signal, there will be transitions in the common boundary of two successive data 0 symbols, and there will be transitions in the middle of the data 1 symbols, but there will not be transitions in the common boundary of the data 0 symbols and the data 1 symbols or in the common boundary of two successive data 1 symbols. Thus, the operation scheme of the comparison circuit 430 of the control unit 140 when the input signal S1 is the Miller basis signal will be different from the above mentioned operation scheme when the input signal S1 is the FM0 encoding signal.

The comparison circuit 430 will perform a comparing operation for the counter value CNT of the counter 420 at the time point with a second predetermined threshold value TH2 and a third predetermined threshold value TH3 each time the comparison circuit 430 receives a pulse wave of the detection signal P1 (i.e. the detector 410 detects that the input signal S1 has a transition). In this embodiment, the second predetermined threshold value TH2 is set to be a counter value corresponding to 3 quarters of the symbol length of an ideal Miller basis signal symbol which is 60, and the third predetermined threshold value TH3 is set to be a counter value corresponding to one quarter of the symbol length of an ideal Miller basis signal symbol which is 20. When the comparison circuit 430 receives a pulse wave of the detection signal P1, if the counter value CNT is larger than the second predetermined threshold value TH2 (60), then the comparison circuit 430 will determine that the transition of the input signal S1 is in the common boundary of two adjacent data 0 symbols; if the counter value CNT is between the second predetermined threshold value TH2 (60) and the third predetermined threshold value TH3 (20), then the comparison circuit 430 will determine that the transition of the input signal S1 is in the middle of the data 1 symbols; if the counter value CNT is smaller than the third predetermined threshold value TH3 (20), then the comparison circuit 430 will determine that the transition of the input signal S1 is in the common boundary of two adjacent symbols. In addition, when the counter value CNT outputted by the counter 420 progressively increases to a fourth predetermined threshold value TH4 (which is 80 in this embodiment) corresponding to the symbol length of an ideal Miller basis signal symbol, even if the comparison circuit 430 does not receive a pulse wave of the detection signal P1 (i.e. the detector 410 does not detect that the input signal S1 has a transition at that time), the comparison circuit 430 of the embodiment will still presume that the time point is in the common boundary of two adjacent symbols in the Miller basis signal.

As shown in the timing diagram 600, the counter 420 starts to perform the counter operation at the beginning time point of the Miller basis signal symbol 602. At the time point 610, the counter value CNT outputted by the counter 420 progressively increases to the fourth predetermined threshold value TH4 (80), but the comparison circuit 430 does not receive a pulse wave of the detection signal P1 (i.e. the input signal S1 does not have a transition at that time). As stated in the above description, the comparison circuit 430 of the embodiment will presume that time point 610 corresponds to the common boundary of two adjacent symbols in the Miller basis signal. Therefore, the comparison circuit 430 will generate an enabling pulse wave in the control signal CTL, so as to reset the counter operation of the counter 420 and command the decision unit 150 to perform a comparing operation for the first matched signal M1 and the second matched signal M2.

At the time point 620, the detector 410 detects that the input signal S1 has a transition, and thus the detector 410 will generate a pulse wave in the detection signal P1 to trigger the comparison circuit 430. Since the counter value CNT (43) at the time point is between the second predetermined threshold value TH2 (60) and the third predetermined threshold value TH3 (20), the comparison circuit 430 will determine that the transition of the input signal S1 is in the middle of the data 1 symbols. In this embodiment, the transition in the middle of the data 1 symbols should ideally occur when the counter value CNT attains 40. Thus, the comparison circuit 430 will adjust the counter value CNT of the counter 420 directly to 40 at this time, so as to let the counter 420 continue to perform the counter operation from 40. The scheme of adjusting the counter value CNT, when a transition occurs in the middle of data 1 symbols, to the counter value corresponding to one-half of the symbol length of the ideal Miller basis signal symbol (which is 40 in this embodiment) is able to compensate for the effects of the symbol length inaccuracy on the counter value CNT, and further improve the accuracy of the comparison circuit 430 in determining the common boundaries between the symbols to follow.

When the counter value CNT outputted by the counter 420 attains to the fourth predetermined threshold value TH4 (80), although the input signal S1 does not have a transition at that time, the comparison circuit 430 of the embodiment will still presume that the time point 630 corresponds to the common boundary of two adjacent symbols in the Miller basis signal. Since the comparison circuit 430 has adjusted the counter value CNT to 40 when the transition in the middle of the Miller basis signal symbol 604 corresponds to the data 1, the time point 630 of the counter value CNT attaining 80 will be quite close to the common boundary of the Miller basis signal symbols 604 and 606 (and may even be exactly the real common boundary). Therefore, the comparison circuit 430 will generate an enabling pulse wave in the control signal CTL, so as to trigger the decision unit 150 and reset the counter operation of the counter 420.

At the time point 640, the counter value CNT outputted by the counter 420 increases to the fourth predetermined threshold value TH4 (80) again. For the same reason, although the comparison circuit 430 does not receive a pulse wave of the detection signal P1, the comparison circuit 430 will still presume that the time point 640 is in the common boundary of two adjacent symbols in the Miller basis signal, and the comparison circuit 430 will generate an enabling pulse wave in the control signal CTL, so as to reset the counter operation of the counter 420 and command the decision unit 150 to perform a comparing operation for the first matched signal M1 and the second matched signal M2.

Next, at the time point 650 a short time after the time point 640, since the detector 410 detects that the input signal S1 has a transition, the detector 410 will generate a pulse wave in the detection signal P1 to trigger the comparison circuit 430. Since the counter value CNT (4) at this time point is smaller than the third predetermined threshold value TH3 (20), the comparison circuit 430 will determine that the transition of the input signal S1 at the time point 650 is in the actual position of the presumed common boundary of the symbols corresponding to the time point 640. Since the comparison circuit 430 has already generated the enabling pulse wave in the control signal CTL at the time point 640 a short time before the time point 650, the comparison circuit 430 will not generate the enabling pulse wave again at the time point 650, but will reset the counter operation of the counter 420 so as to let the counter 420 restart the counter operation from the actual common boundary of the symbols.

At the time point 660, since the input signal S1 has a transition occurring, the detector 410 will generate a pulse wave in the detection signal P1 to trigger the comparison circuit 430. Since the counter value CNT (77) at this time point is larger than the second predetermined threshold value TH2 (60), the comparison circuit 430 will determine that the transition of the input signal S1 is in the common boundary of two successive data 0 symbols. Thus, the comparison circuit 430 will generate an enabling pulse wave in the control signal CTL, so as to reset the counter operation of the counter 420 and command the decision unit 150 to perform a comparing operation for the first matched signal M1 and the second matched signal M2.

As with the embodiment of processing the FM0 encoding signals, the scheme of resetting the counter value in the common boundary of the Miller basis signal symbols is able to prevent the length inaccuracy of the prior symbols from being accumulated on the counter value CNT and affecting the accuracy of the comparison circuit 430 when determining the positions of the common boundary between the symbols to follow.

It is known from the description above that even if there is inaccuracy in the symbol time of the Miller basis signal symbol in the input signal S1, and there is not necessarily a transition occurring in the common boundary of the symbols, the above disclosed control unit 140 is still able to determine the ending position of every symbol in the Miller basis signal correctly (or within a fairly small error range). Furthermore, please note that the scheme of setting the second predetermined threshold value TH2, the third predetermined threshold value TH3, and the fourth predetermined threshold value TH4 is only an embodiment, and not a limitation of the practical realization of the present invention.

In this embodiment, when the decision unit 150 is triggered by the enabling pulse waves of the control signal CTL, if the signal value of the first matched signal M1 is larger than the signal value of the second matched signal M2, then the decision unit 150 will set the read-back signal RB to be logic 0, and if the signal value of the first matched signal M1 is smaller than the signal value of the second matched signal M2, then the decision unit 150 will set the read-back signal RB to be logic 1.

Figure 7:
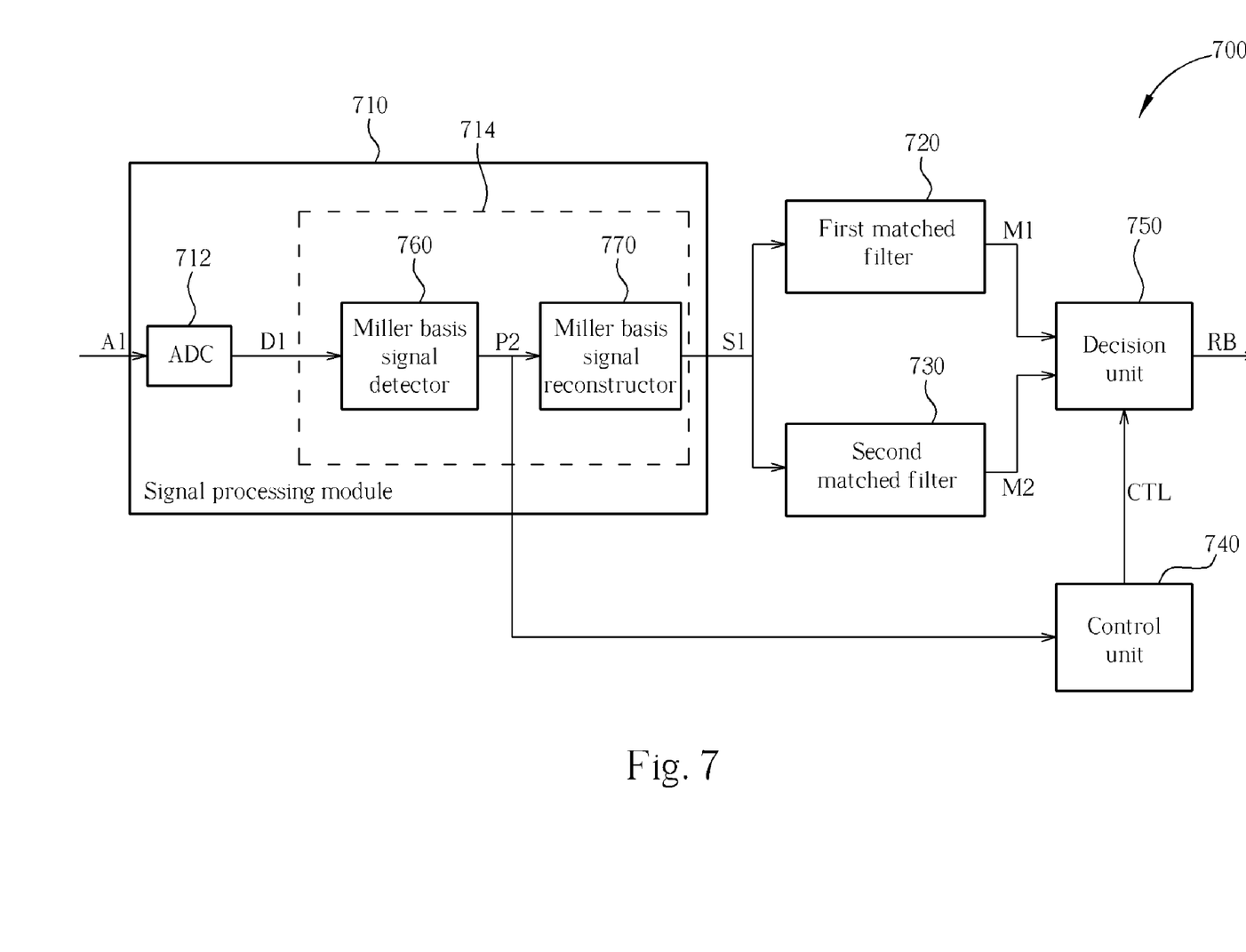
FIG. 7 is a simplified block diagram of an RFID interrogator according to another embodiment of the present invention.

Please refer to FIG. 7. FIG. 7 shows a simplified block diagram of an RFID interrogator 700 according to another embodiment of the present invention. As shown in FIG. 7, the RFID interrogator 700 includes: a signal processing module 710 utilized for generating a detection signal P2 and an input signal S1 according to a transmission signal A1 transmitted from an RFID tag (not shown), wherein the detection signal P2 and symbol transitions correspond to the input signal S1; a first matched filter 720 utilized for generating a first matched signal M1 according to the input signal S1 and a first predetermined signal pattern; a second matched filter 730 utilized for generating a second matched signal M2 according to the input signal S1 and a second predetermined signal pattern; a control unit 740 utilized for generating a control signal CTL; and a decision unit 750 utilized for comparing the first matched signal M1 with the second matched signal M2 to generate a read-back signal RB when the enabling pulse waves of the control signal CTL are generated.

In this embodiment, the transmission signal A1 is the Miller encoding signal, and the input signal S1 is the Miller basis signal. Under this condition, the first predetermined signal pattern utilized by the first matched filter 720 corresponds to the data 0 symbol of the Miller basis signal, and the second predetermined signal pattern utilized by the second matched filter 730 corresponds to the data 1 symbol of the Miller basis signal. In this embodiment, when the input signal S1 conforms with the first predetermined signal pattern, the signal value of the first matched signal M1 outputted by the first matched filter 720 will be larger than when the input signal S1 does not conform with the first predetermined signal pattern. Similarly, when the input signal S1 conforms with the second predetermined signal pattern, the signal value of the second matched signal M2 outputted by the second matched filter 730 will be larger than when the input signal S1 does not conform with the second predetermined signal pattern.

As shown in FIG. 7, the signal processing module 710 includes an ADC 712 and a Miller demodulator 714, wherein the ADC 210 is utilized for converting the transmission signal A1 in analog format into a digital signal D1, and the Miller demodulator 714 is utilized for generating the detection signal P2 according to the digital signal D1, and generating a Miller basis signal according to the detection signal P2 in order to be the input signal S1. In this preferred embodiment, the Miller demodulator 714 includes a Miller basis signal detector 760 and a Miller basis signal reconstructor 770. The Miller basis signal detector 760 is designed and utilized for generating the detection signal P2 corresponding to the transition position of the Miller basis signal corresponding to the digital signal D1, and the Miller basis signal reconstructor 770 is utilized for reconstructing the Miller basis signal to be the input signal S1 corresponding to the digital signal D1 according to the detection signal P2. The realization and operation scheme of the Miller demodulator 714 will be further described with reference to FIG. 8 and FIG. 9 in the following paragraphs.

Figure 8:
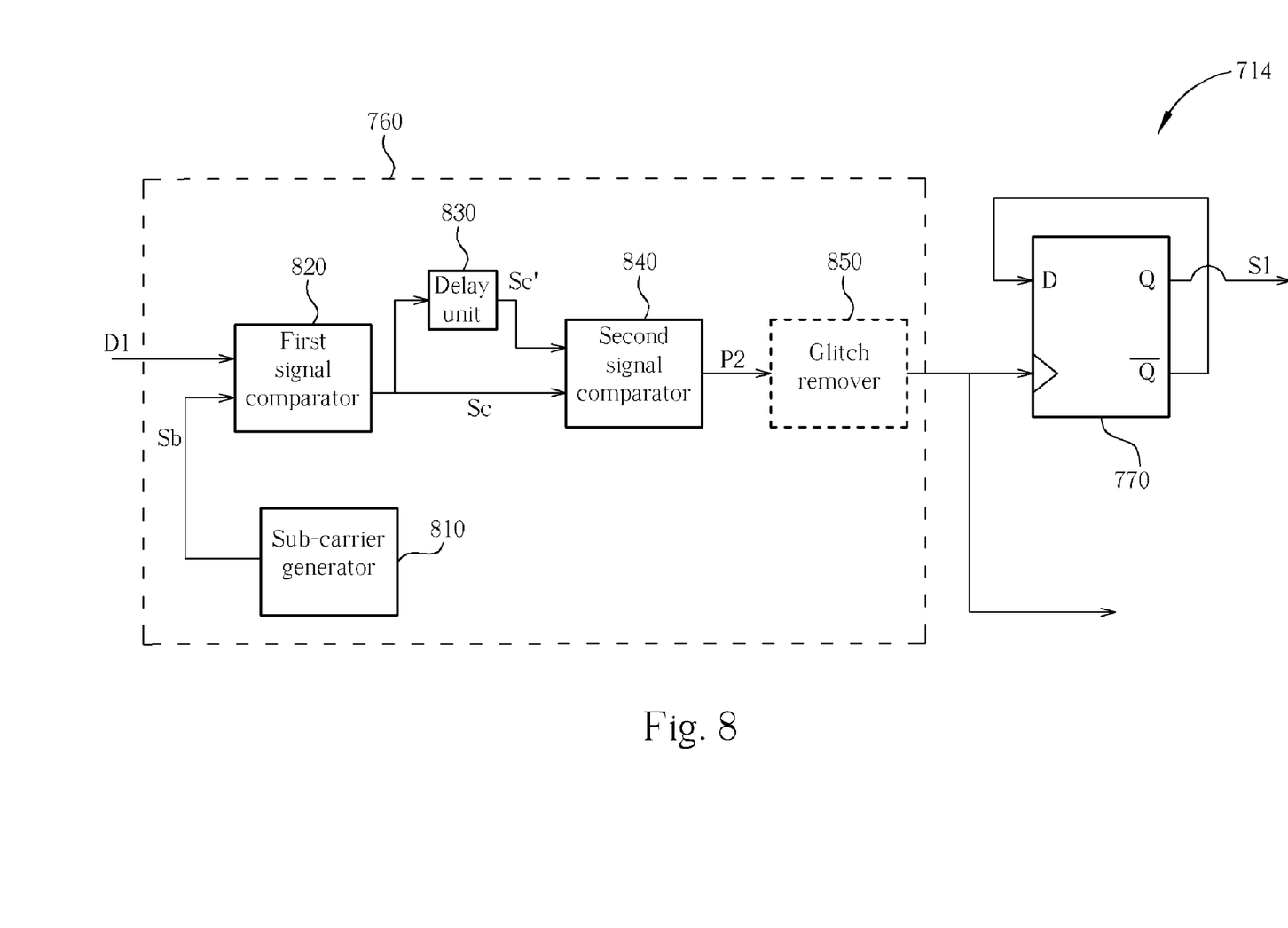
FIG. 8 is a simplified block diagram of the Miller demodulator shown in FIG. 7 according to another embodiment of the present invention.
Figure 9:
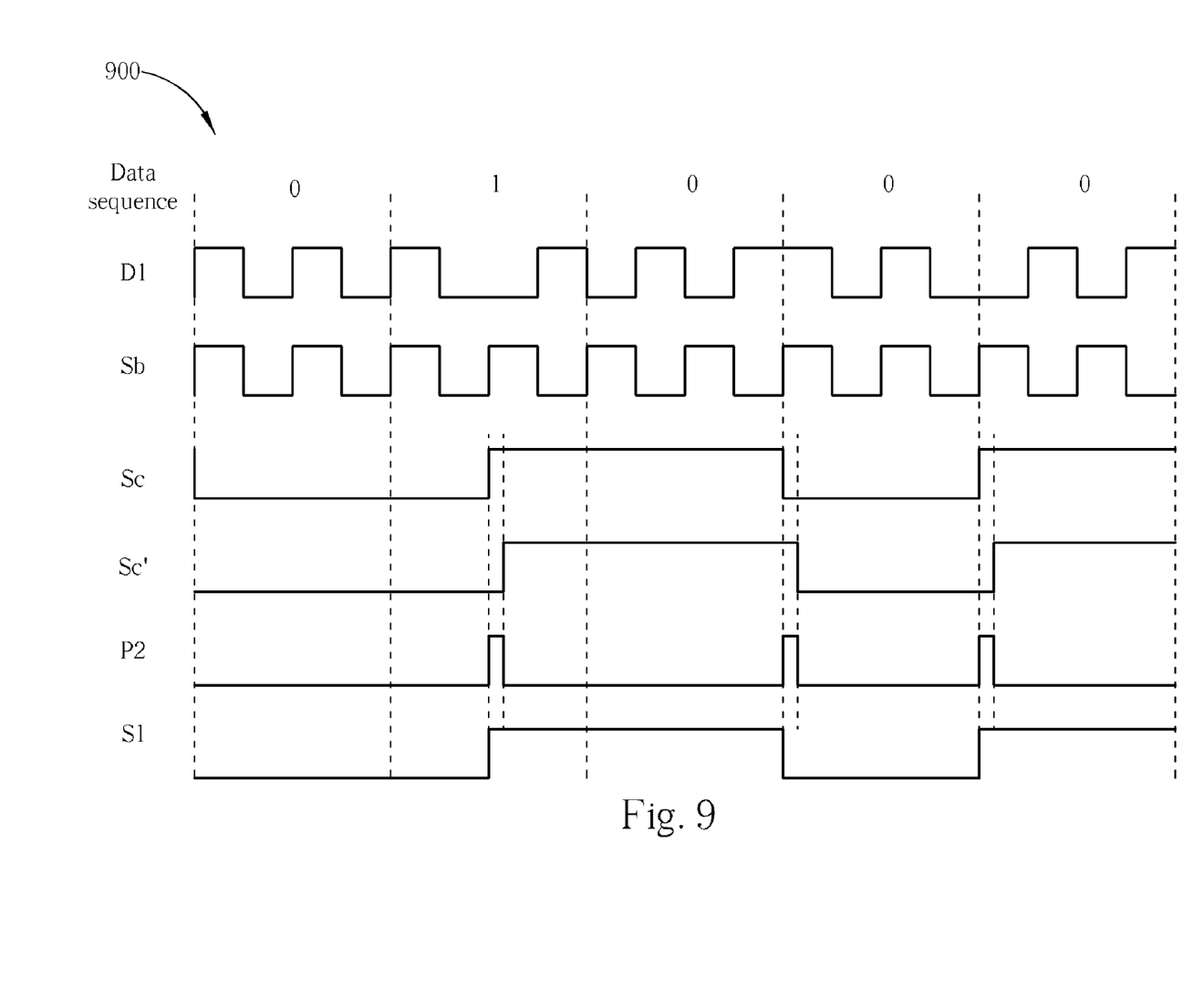
FIG. 9 is a timing diagram for the Miller demodulator shown in FIG. 7 according to an operation embodiment of the present invention.

Please refer to FIG. 8 and FIG. 9. FIG. 8 shows a simplified block diagram of the Miller demodulator 714 according to another embodiment of the present invention, and FIG. 9 depicts a timing diagram 900 for the Miller demodulator 714 according to an operation embodiment of the present invention. As shown in FIG. 8, the Miller basis signal detector 760 of the Miller demodulator 714 includes a sub-carrier generator 810, a first signal comparator 820, a delay unit 830, and a second signal comparator 840. The sub-carrier generator 810 is utilized for generating a sub-carrier signal Sb corresponding to the transmission signal A1. For brevity of description, the digital signal D1 is assumed to correspond to the Miller encoding signal in the data sequence 0100 where the value of M is equal to 2 in the timing diagram 900. Since the value of M is indicated by the RFID interrogator 700 in practice, the value of M is already known for the sub-carrier generator 810. In addition, the sub-carrier generator 810 is able to estimate the symbol length in the digital signal D1 according to a preamble in the digital signal D1, and to generate the sub-carrier signal Sb shown in the timing diagram 900 according to the estimated symbol length and the value of M.

In the Miller basis signal detector 760, the first signal comparator 820 is utilized for comparing the digital signal D1 with the sub-carrier signal Sb to generate a comparison signal Sc. The delay unit 830 is utilized for delaying the comparison signal Sc so as to generate a delay signal Sc'. The second signal comparator 840 is utilized for comparing the comparison signal Sc with the delay signal Sc' so as to generate the detection signal P2. In this embodiment, the first signal comparator 820 is an XOR logic, and is utilized for performing an XOR operation for the digital signal D1 and the sub-carrier signal Sb, so as to generate the comparison signal Sc shown in the timing diagram 900; the second signal comparator 840 is also an XOR logic and is utilized for performing an XOR operation for the comparison signal Sc and the delay signal Sc', so as to generate the detection signal P2.

Please note that the first signal comparator 820 can also be realized by an NXOR logic in practice. In a preferred embodiment, a glitch remover 850 will be further implemented at the back stage of the second signal comparator 840 in the Miller basis signal detector 760, and is utilized for reducing the glitch in the detection signal P2.

As shown in FIG. 8, the Miller basis signal reconstructor 770 is realized by utilizing a D flip-flop in this embodiment, wherein a clock input node of the D flip-flop is coupled to the detection signal P2 outputted by the Miller basis signal detector 760, and an inverting data output node of the D flip-flop is coupled to a data input node of the flip-flop. In this way, the input signal S1 outputted by a non-inverting data output node of the D flip-flop is the Miller basis signal corresponding to the digital signal D1. Please note that utilizing the D flip-flop to realize the Miller basis signal reconstructor 770 is only an embodiment, and not a limitation of the practical realization of the present invention. In practice, the Miller basis signal reconstructor 770 can also be realized by utilizing other types of flip-flop or combination logic.

Figure 10:
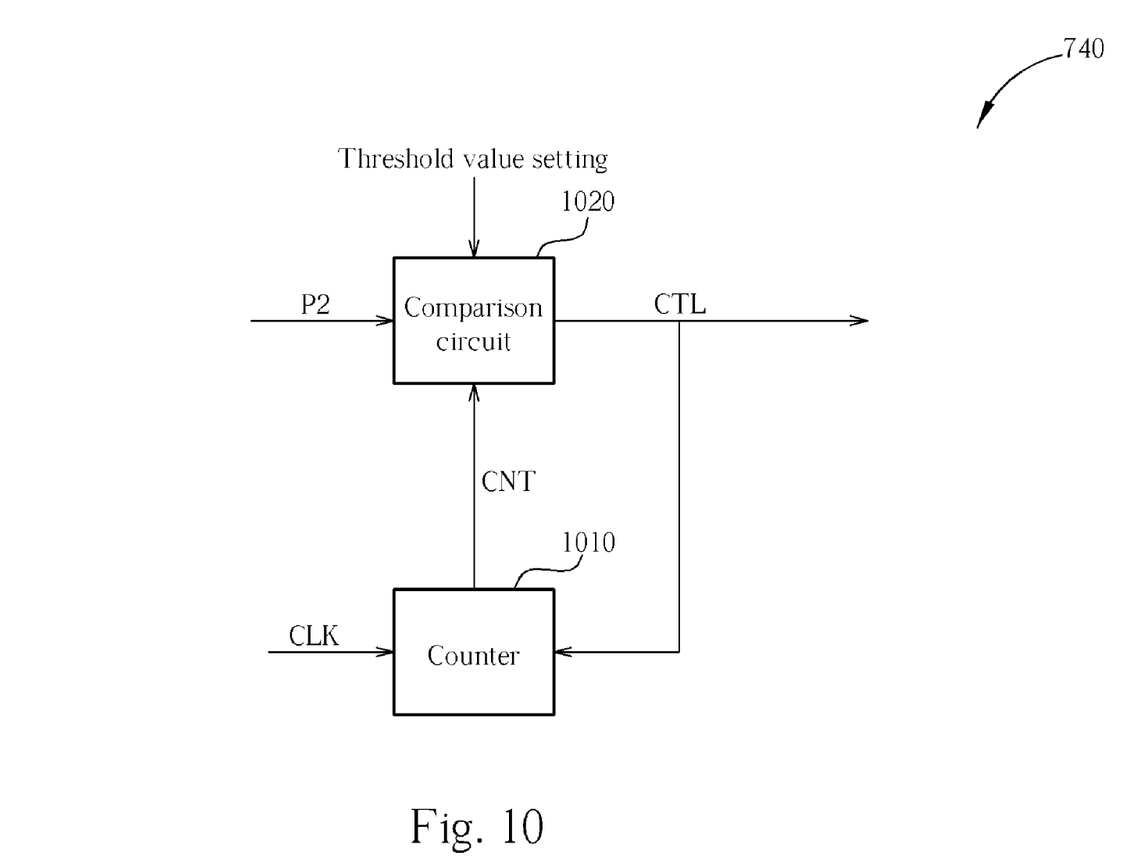
FIG. 10 is a simplified block diagram of the control unit of the RFID interrogator shown in FIG. 7 according to an embodiment of the present invention.

Please refer to FIG. 10. FIG. 10 shows a simplified block diagram of the control unit 740 of the RFID interrogator 700 according to an embodiment of the present invention. As shown in FIG. 10, the control unit 740 includes a counter 1010 and a comparison circuit 1020. It is known from the timing diagram 900 that the pulse wave position in the detection signal P2 corresponds to the transition position of the input signal S1, and thus the detection signal P2 has substantially the same signal meaning as the detection signal P1 shown in FIG. 6. Therefore, in the control unit 740, the detector 410 utilized for detecting transitions of the input signal S1 in FIG. 4 mentioned above can be omitted. Since the operation schemes of the counter 1010 and the comparison circuit 1020 in the control unit 740 are substantially the same as the counter 420 and the comparison circuit 430 in FIG. 4 respectively, further explanation is omitted herein for the sake of brevity.

Please note that the various schemes of the RFID interrogators disclosed in the present invention are not only capable of improving the accuracy of interrogating the data transmitted back from the various types of passive electronic tags, but also suitable for use in all kinds of applications of the active electronic tags.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A radio frequency identification (RFID) interrogator, comprising:
    a signal processing module, for generating an input signal according to a transmission signal transmitted from an RFID tag;
    a first matched filter, coupled to the signal processing module, for generating a first matched signal according to the input signal and a first predetermined signal pattern;
    a second matched filter, coupled to the signal processing module, for generating a second matched signal according to the input signal and a second predetermined signal pattern;
    a control unit, for generating a control signal according to the input signal; and
    a decision unit, coupled to the first matched filter, the second matched filter and the control unit, for comparing the first matched signal with the second matched signal according to the control signal to generate a read-back signal;
wherein the signal processing module comprises:
    an analog-to-digital converter (ADC), for converting the transmission signal into a digital signal; and
    a demodulator, coupled to the ADC, for demodulating the digital signal to a Miller basis signal as the input signal, wherein the demodulator comprises:
    a sub-carrier generator, for generating a sub-carrier signal corresponding to the transmission signal; and
    a signal comparator, coupled to the sub-carrier generator, for comparing the digital signal with the sub-carrier signal so as to generate the Miller basis signal.

2. The RFID interrogator of claim 1, wherein when the decision circuit compares the first matched signal and the second matched signal, if a value of the first matched signal is larger than a value of the second matched signal, then the decision unit outputs a logic 0 as the read-back signal, and if the value of the first matched signal is smaller than the value of the second matched signal, then the decision unit outputs a logic 1 as the read-back signal.

3. The RFID interrogator of claim 1, wherein the first predetermined signal pattern corresponds to data 0 symbol of the Miller basis signal, and the second predetermined signal pattern corresponds to data 1 symbol of the Miller basis signal.

4. The RFID interrogator of claim 1, wherein the demodulator further comprises a glitch remover coupled to the signal comparator and utilized for reducing glitch in the Miller basis signal.

5. The RFID interrogator of claim 1, wherein the signal comparator is an exclusive OR (XOR) or a not exclusive OR (NXOR) logic.

6. The RFID interrogator of claim 1, wherein the control unit comprises:
    a detector, for detecting transitions of the input signal;
    a counter, for performing a counting operation according to a clock signal so as to output a counter value; and
    a comparison circuit, coupled to the detector and the counter, for comparing the counter value with at least a first threshold value so as to determine the control signal.

7. The RFID interrogator of claim 6, wherein when the detector detects a transition, if the counter value is larger than a second threshold value, then the comparison circuit utilizes the control signal to command the decision unit to compare the first matched signal and the second matched signal.

8. The RFID interrogator of claim 7, wherein the comparison circuit resets the counting operation of the counter.

9. The RFID interrogator of claim 6, wherein when the detector detects a transition, if the counter value is between a second threshold value and a third threshold value, then the comparison circuit sets the counter value of the counter to a predetermined value.

10. The RFID interrogator of claim 7, wherein when the detector detects the transition, if the counter value is smaller than a third threshold value, then the comparison circuit resets the counting operation of the counter.

11. The RFID interrogator of claim 10, wherein if the counter value reaches a fourth threshold value, then the comparison circuit utilizes the control signal to command the decision unit to compare the first matched signal and the second matched signal, and reset the counter.

12. A radio frequency identification (RFID) interrogator, comprising:
a signal processing module, for generating an input signal according to a transmission signal transmitted from an RFID tag;
a first matched filter, coupled to the signal processing module, for generating a first matched signal according to the input signal and a first predetermined signal pattern;
a second matched filter, coupled to the signal processing module, for generating a second matched signal according to the input signal and a second predetermined signal pattern;
a control unit, for generating a control signal according to the input signal; and
a decision unit, coupled to the first matched filter, the second matched filter and the control unit, for comparing the first matched signal with the second matched signal according to the control signal to generate a read-back signal; wherein the control unit comprises:
a detector, for detecting transitions of the input signal;
a counter, for performing a counting operation according to a clock signal so as
to output a counter value; and
a comparison circuit, coupled to the detector and the counter, for comparing the counter value with a first threshold value when the detector detects a transition so as to determine the control signal.

13. The RFID interrogator of claim 12, wherein if the counter value is larger than the first threshold value, the comparison circuit utilizes the control signal to command the decision unit to compare the first matched signal and the second matched signal.

14. The RFID interrogator of claim 13, wherein the comparison circuit also resets the counting operation of the counter.

15. A radio frequency identification (RFID) interrogator, comprising:
a signal processing module, for generating a detection signal and an input signal according to a transmission signal transmitted from an RFID tag, wherein the detection signal corresponds to transitions of the input signal;
a first matched filter, coupled to the signal processing module, for generating a first matched signal according to the input signal and a first predetermined signal pattern;
a second matched filter, coupled to the signal processing module, for generating a second matched signal according to the input signal and a second predetermined signal pattern;
a control unit, for receiving the detection signal so as to generate a control signal; and
a decision unit, coupled to the first matched filter, the second matched filter and the control unit, for comparing the first matched signal with the second matched signal according to the control signal to generate a read-back signal.
wherein the signal processing module comprises:
an analog-to-digital converter (ADC), for converting the transmission signal into a digital signal; and
a demodulator, coupled to the ADC, for generating the detection signal according to the digital signal, and generating a Miller basis signal as the input signal according to the detection signal.
wherein the demodulator comprises:
a Miller basis signal detector, for generating the detection signal according to the digital signal; and
a Miller basis signal reconstructor, coupled to the Miller basis signal detector, for generating the Miller basis signal according to the detection signal.

16. The RFID interrogator of claim 15, wherein the first predetermined signal pattern corresponds to data 0 symbol of a Miller basis signal, and the second predetermined signal pattern corresponds to data 1 symbol of the Miller basis signal.

17. The RFID interrogator of claim 15, wherein the Miller basis signal detector comprises:
a sub-carrier generator, for generating a sub-carrier signal corresponding to the transmission signal;
a first signal comparator, coupled to the sub-carrier generator, for comparing the digital signal with the sub-carrier signal so as to generate a comparison signal;
a delay unit, coupled to the first signal comparator, for delaying the comparison signal so as to generate a delay signal; and
a second signal comparator, coupled to the first signal comparator and the delay unit, for comparing the comparison signal with the delay signal so as to generate the detection signal.

18. The RFID interrogator of claim 17, wherein the Miller basis signal detector further comprises a glitch remover coupled to the second signal comparator and utilized for reducing glitch in the detection signal.

19. The RFID interrogator of claim 17, wherein the first signal comparator is an exclusive OR (XOR) or a not exclusive OR (NXOR) logic.

20. The RFID interrogator of claim 17, wherein the second signal comparator comprises an exclusive OR (XOR) logic for performing an XOR operation on the comparison signal and the delay signal so as to generate the detection signal.

21. The RFID interrogator of claim 15, wherein the Miller basis signal reconstructor is a flip-flop, a clock input node of the flip-flop is coupled to an output node of the Miller basis signal detector, an inverting data output node of the flip-flop is coupled to a data input node of the flip-flop, and a non-inverting data output node of the flip-flop is utilized for providing the Miller basis signal.

22. The RFID interrogator of claim 15, wherein the control unit comprises: a counter, for performing a counting operation according to a clock signal so as to output a counter value; and
a comparison circuit, coupled to the counter, for comparing the counter value with at least a first threshold value so as to determine the control signal.

23. The RFID interrogator of claim 22, wherein when the comparison circuit is triggered by the detection signal, if the counter value is larger than a second threshold value, then the comparison circuit utilizes the control signal to command the decision unit to compare the first matched signal and the second matched signal.

24. The RFID interrogator of claim 23, wherein the comparison circuit resets the counting operation of the counter.

25. The RFID interrogator of claim 22, wherein when the comparison circuit is triggered by the detection signal, if the counter value is between a second threshold value and a third threshold value, then the comparison circuit sets the counter value of the counter to a predetermined value.

26. The RFID interrogator of claim 23, wherein when the comparison circuit is triggered by the detection signal, if the counter value is smaller than a third threshold value, then the comparison circuit resets the counting operation of the counter.

27. The RFID interrogator of claim 26, wherein if the counter value reaches a fourth threshold value, then the comparison circuit utilizes the control signal to command the decision unit to compare the first matched signal and the second matched signal, and reset the counter.

* * * * *